US012770144B1

(12) United States Patent
Mars et al.

(10) Patent No.: US 12,770,144 B1
(45) Date of Patent: Oct. 20, 2026

(54) METHODS AND APPARATUS FOR PRIVACY-CONTROLLED SECURE TRANSACTIONS

(71) Applicant: OURARING INC., San Francisco, CA (US)

(72) Inventors: Denis Mars, San Francisco, CA (US); Simon Ratner, San Francisco, CA (US)

(73) Assignee: OURARING INC., San Francisco, CA (US)

( * ) Notice: Subject to any disclaimer, the term of this patent is extended or adjusted under 35 U.S.C. 154(b) by 364 days.

(21) Appl. No.: 17/465,726

(22) Filed: Sep. 2, 2021

Related U.S. Application Data

(60) Provisional application No. 63/073,578, filed on Sep. 2, 2020.

(51) Int. Cl.

| | |
|---|---|
| ***G06Q 20/40*** | (2012.01) |
| ***G06Q 20/32*** | (2012.01) |
| ***H04W 12/02*** | (2009.01) |

(52) U.S. Cl.
CPC ....... *G06Q 20/401* (2013.01); *G06Q 20/3226* (2013.01); *H04W 12/02* (2013.01)

(58) Field of Classification Search
None
See application file for complete search history.

(56) References Cited

U.S. PATENT DOCUMENTS

2021/0166224 A1* 6/2021 Mars .................. G06Q 20/0855

* cited by examiner

*Primary Examiner* — Matthew S Gart
*Assistant Examiner* — Amit Patel
(74) *Attorney, Agent, or Firm* — ArentFox Schiff LLP

(57) ABSTRACT

A method includes outputting with a first device, a first ID and a first ephemeral ID to a server, the first ephemeral ID ephemerally associated with a first party, associating in the server the first account and the first ephemeral ID, outputting with the first device a first data set including the first ephemeral ID to a second device, outputting with the second device of a second party, a second ID and a second ephemeral ID and the first data set to the server, wherein the second ephemeral ID is ephemerally associated with the second party, determining with the server a second account in response to the second ID, and transferring with the server an asset from the second account to the first account, wherein the second device only stores the first ephemeral ID of the first party.

20 Claims, 3 Drawing Sheets

METHODS AND APPARATUS FOR PRIVACY-CONTROLLED SECURE TRANSACTIONS

CROSS-REFERENCE TO RELATED CASES

The present invention claims priority to and is a non-provisional of U.S. App. No. 63/073,578 filed Sep. 2, 2020. That application is incorporated by reference here in for all purposes.

BACKGROUND

The present invention relates to computer hardware systems facilitating secure transactions. More specifically, the present invention relates to computer hardware systems facilitating secure transactions while maintaining privacy of users.

User control of goods, services, locations, money, digital assets or the like are often based upon "identification" of the user. The identification may be direct, i.e. through the capture of biometric data of the user, passwords, identification cards or the like, or indirect, i.e. based upon presentation of a smart card, credit card, or the like. Additionally, the identifications are typically performed on demand, in real-time.

As an example of direct authentication, a user may provide a thumb print to a transaction terminal, in response the terminal may send the thumb print to a fingerprint database, the database may authenticate the fingerprint and send an authentication signal back to the terminal. Alternatively, the user may present a physical identification card or a digital identity credential that is captured and may be verified against a database. In response to the authentication, the terminal may open a gate for the user to pass, money may be transferred, or the like. A problem with such approaches includes that privacy is often forfeited by the user. More specifically, when user identification (e.g. name home address, etc.) or biometric data of the user is captured, stored locally in the transaction terminal, and is often transmitted over computer networks for comparison in identity (e.g. biometric) or other databases. Because such personal data is highly sensitive, the computer networks, the databases, and the like are often targets for attack by hackers, governments, or the like. Another problem with user privacy is that the user's transaction, e.g. access to goods, services, money, digital assets or the like may recorded in behavioral databases. Because of this, behavioral profiles may be built up and used to target the user, all without the user's consent.

As an example of indirect authentication, a user may present a credit card to a point of sale terminal (POS) terminal, in response the terminal may read the credit card and send the credit card to the card issuer. The credit card issuer may authenticate the card and send an authentication signal back to the terminal. Finally, the terminal may indicate a sale, may provide a good, retract a door, transfer the asset (e.g. money, digital asset) or the like in response to the credit card. A problem with such approaches is that the POS terminal (e.g. retailer) will typically record the name of the user along with the credit card in their database. These databases for the POS terminal are thus also good targets for hackers, governmental and non-governmental actors, or the like.

In light of the above, what is desired are system and methods enabling secure transactions without the drawbacks discussed above.

SUMMARY

The present invention relates to hardware systems facilitating secure transactions. More specifically, the present invention relates to hardware systems facilitating secure transactions while maintaining privacy of users.

Some embodiments of the present invention includes two parties attempting to perform a transaction, e.g. transferring money, transferring a digital asset (e.g. bitcoin), transferring ownership of an asset, or the like, via a cloud-based transaction server that maintains privacy control of both parties with respect to the other party.

In some embodiments, a first party may not be registered with a transaction server, but the second party is registered. To facilitate the transaction, the unregistered first party's device (e.g. phone, wearable, smart watch, etc.) contact an application server, download and installation for a software application facilitating communication with the transaction server, in real-time. Once the first party is register with the application server, the first smart device provides a non-permanent identifier (e.g. first ephemeral ID) that temporarily identifies the first party to the world. In some embodiments, the first ephemeral ID is provided to a smart device of second party. The second smart device sends the first ephemeral ID as well as data identifying the second user to the transaction server, typically authorizing the transaction (e.g. amount, account number, asset locker, asset pointer, etc.) In some embodiments, the transaction server transfers the asset from the second user's account to the first user's account, using the first ephemeral ID to identify the first user's account. In other embodiments, before performing the transfer, the transaction serve may contact the first user and/or the second user to verify the transaction.

In some embodiments, a sender and a receiver may both be registered with a transaction server. To facilitate the transaction, a first smart device of the receiver provides a first data set including a non-permanent identifier (e.g. first ephemeral ID) that temporarily identifies the receiver to the world. In some embodiments, the first data set includes additional data such as a nonce, time stamp, and the like that is provided to a smart device of the sender. The second smart device sends the first ephemeral ID (and nonce) as well as data identifying the sender to the transaction server, typically authorizing the transaction (e.g. amount, account number, asset locker, asset pointer, etc.) In some embodiments, the transaction server transfers the asset from the sender's account to the receiver's account, using the first ephemeral ID to identify the payer's account. The transaction server may then return a token formed, in part, with the first ephemeral ID and nonce. This token is passed to the receiver, who then determines whether the token is authentic (e.g. encrypted using a private key of the transaction server) by using a public key of the transaction server, for example, and comparing the decrypted first ephemeral ID and nonce, or the like. If authentic, the receiver's smart device indicates the transaction is complete. In other embodiments, the receiver and/or the payer may also be asked to authenticate the transaction, by replying directly back to the transaction server. In still other embodiments, before performing the transfer, the transaction serve may contact the first user and/or the second user to verify the transaction.

According to one aspect, a system for secure transfer of an asset with increased party privacy is described. A system may include a cloud-based transaction server storing a first account associated with a first party and a second account associated with a second party. A device may include a first smart device coupled to a cloud-based transaction server, including a first processor, a first wide-area network transceiver coupled to the first processor, wherein the first wide-area network transceiver is configured to output first identification data associated with the first party and a first ephemeral identifier to the cloud-based transaction server under direction of the first processor, wherein the first ephemeral identifier is not permanently, i.e. ephemerally, associated with the first party, and a first short-range transceiver coupled to the first processor, wherein the first short-range transceiver is configured to output first data comprising the first ephemeral identifier under direction of the first processor. An apparatus may include a second smart device coupled to a cloud-based transaction server and to a first smart device including a second processor, a second short-range transceiver coupled to the second processor, wherein the second short-range transceiver is configured to receive the first data from the first smart device, and a second wide-area network transceiver coupled to the second processor, wherein the second wide-area network transceiver is configured to output second identification data associated with the second party, a second ephemeral identifier, the first data, and a request to the cloud-based transaction server under direction of the second processor, wherein the second ephemeral identifier is ephemerally associated with the second party. In some systems, a cloud-based transaction server is configured to identify the second account associated with the second party in response to the second identification data, the cloud-based transaction server is also configured to identify the first account associated with the first party in response to the first ephemeral identifier, and the cloud-based transaction server is also configured to transfer an asset from the second account to the first account, in response to the request. In some embodiments, the only data associated with the first party that is stored in a second smart device is a first ephemeral identifier of the first party.

According to another aspect, a method for a system to provide secure transfer of an asset with increased party privacy is disclosed. A process may include outputting with a first wide-area network transceiver of a first smart device first identification data associated with a first party and a first ephemeral identifier to the cloud-based transaction server, wherein the first ephemeral identifier is ephemerally associated with the first party, determining with the cloud-based transaction server a first account associated with the first party in response to the first identification data, and associating with the cloud-based transaction server the first account associated with the first ephemeral identifier. A method may include outputting with a first short-range transceiver of the first smart device a first data set comprising the first ephemeral identifier to a second smart device, receiving with a second short-range transceiver of a second smart device the first data set from the first smart device, and outputting with a second wide-area network transceiver of the second smart device second identification data associated with a second party, a second ephemeral identifier, and at least a portion of the first data set to the cloud-based transaction server, wherein the second ephemeral identifier is ephemerally associated with the second party. A technique may include determining with the cloud-based transaction server a second account associated with the second party in response to the second identification data and transferring with the cloud-based transaction server an asset from the second account to the first account. In some embodiment, the only data associated with the first party that is stored in the second smart device is the first ephemeral identifier.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
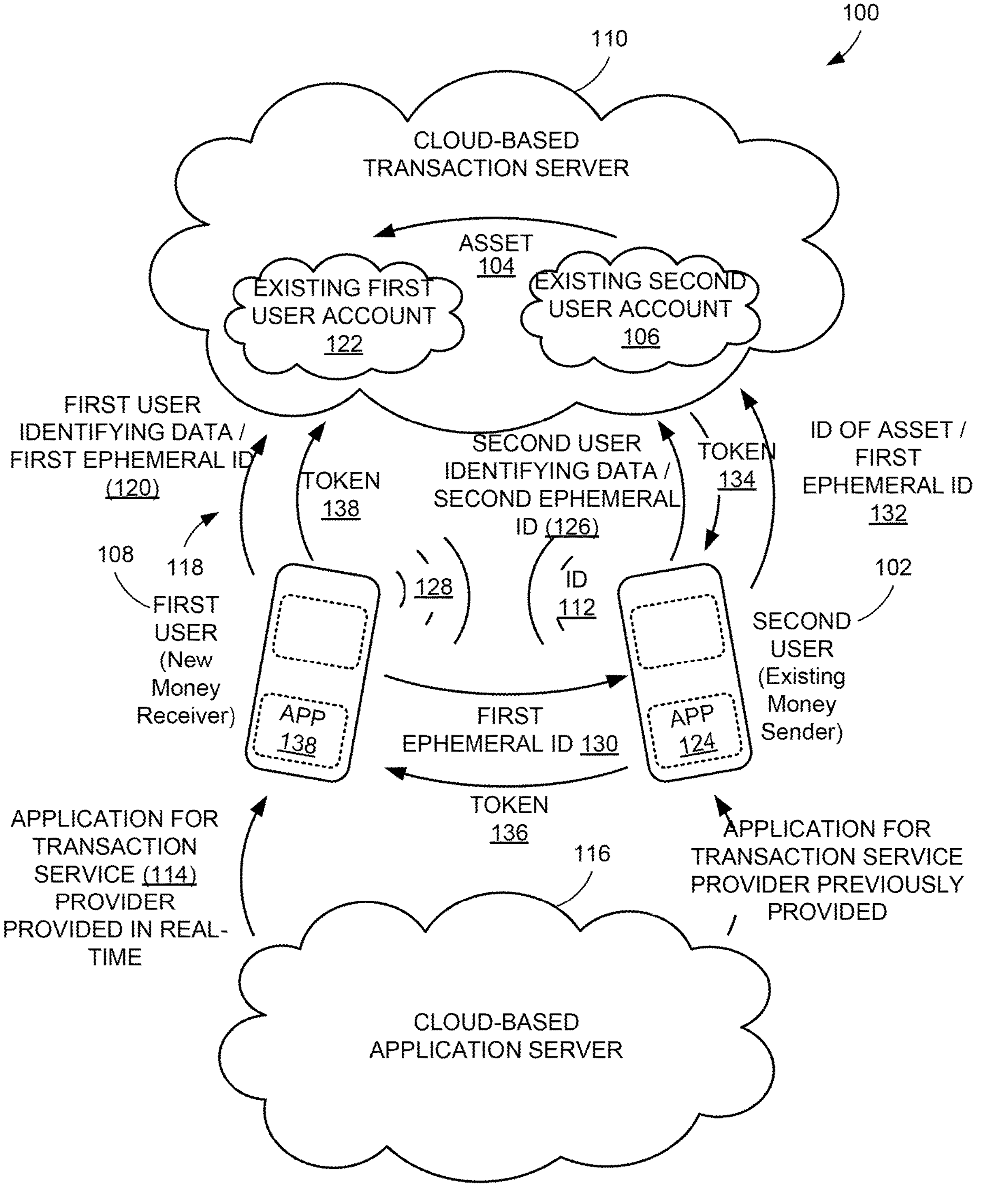
FIG. 1 illustrates a system diagram according to various embodiments.

FIG. 1 illustrates a system diagram according to various embodiments. More specifically, FIG. 1 illustrates systems 100 enabling high privacy transactions. Various embodiments enable processes for smart devices to conduct transactions with other smart devices via a secure server 110, with reduced exposure of personally identifiable information to the other party. As devices store less personally identifiable information than conventional systems, they are less subject to targeting by hackers, phishing attacks, or the like, accordingly performance and reliability of such systems are advantageously increased. In some embodiments, users can select the amount of personally identifiable information, e.g. name, email address, telephone number, etc. they wish to share with the other party, if any at all.

In the following embodiments, a second user 102 desires to transfer an asset 104 (e.g. data, money, blockchain address, etc.) from the second user's account 106 to a first user 108. The second user 102 (user's device) is initially registered with the secure server 110, but a first user 108 is not initially registered.

Techniques for enabling payments to be received by a first user 108 (not registered) from a second user 102 (registered) are described below:

First User Interactions (See FIG. 1):

A second user 102 has an account established with a first (transaction) service provider 110 and has a pre-formed identifier 112 (NFC tag, QR code, optical code, rf tag) associated with the first (transaction) service provider 110. In some embodiments, the pre-formed identifier 112 may also include data that identifies the second user 102 to the first service provider 110;

A first user 108 does not have an account established with a first (transaction) service provider 100 (SaaS, VM server, etc.);

The first user 108 uses the first smart phone to capture (NFC communication, image capture, rf transmission) the pre-formed identifier 112;

The first user's smart phone loads 114 (via download from a software provider, or pre-cached) a first software application 138 (associated with the first service provider 110 (via wideband, e.g. WIFI, 4G, 5G, mesh network, etc.) from an application server 116;

The first user's smart phone uses biometric authentication (via smart phone operating system) used to authorize the installation or running of the first software application 114;

The first smart phone activates the first software application 114 when the first users' biometric data are confirmed;

A communication channel is initiated between the first smart device and the first service provider (via wideband) 118;

The first smart phone provides identifying information to the first service provider 110 (e.g. a telephone number, an email address, a name, etc.) and non-permanent identifying information (e.g. a first ephemeral identifier, MAC address, etc.) 120;

The first service provider 110 creates an account associated with the first user 122 and associates the first user's permanent identifying information and non-permanent identifying information (e.g. the first ephemeral ID).

Second User Interactions:

The second user (via the second user's smart device) 102 has an account 106 established with the first service provider 110 (e.g. associated with identifying information of the second user, e.g. the telephone number, e-mail address, name, etc.);

The second user 102 requests execution of a second software program 124 associated with the first service provider (pre-loaded, pre-cached, etc.) on their smart device;

The second user's smart phone performs biometric authentication (via smart phone operating system) to authorize the second user 102 to access the second software program;

The second smart phone activates the second software application 124 when the second user's biometric data is confirmed;

The second smart phone initiates a communication channel between the second smart device and the first service provider 110 (via wideband);

The second smart phone provides permanently identifying information to the first server (e.g. a telephone number, an email address, etc.) and non-permanent identifying information (e.g. a second ephemeral identifier, MAC address, etc.) 126;

The first server determines 110 an account 106 associated with the second user 102 and associates the second user's account with the non-permanent identifying information (e.g. second ephemeral ID).

First and Second User Interactions:

The second smart phone advertises its presence (i.e. wirelessly, e.g. via Bluetooth, BLE, UWB, Zigbee or other short range wireless communication);

The first smart phone receives the presence signal and establishes communication with the second smart phone 128 (i.e. wirelessly, e.g. Wi-Fi, Bluetooth, UWB, ZigBee, etc.);

The first smart phone provides non-identifiable data, e.g. the first ephemeral identifier and other unique data (e.g. nonce, random number), to the second smart phone (e.g. wirelessly) 130;

The second user specifies an amount (asset location, etc.) via the second software application 124 with the second smart phone;

The second smart phone under direction of the second software application 124 uploads the amount, the first ephemeral identifier and the unique data 132 to the first service provider (e.g. via wideband) 110;

The first service provider 110 identifies the first user account 122 associated with the first ephemeral identifier that was provided 132;

The first service provider 110 identifies the preestablished second user account 106, based upon the second user data (i.e. identifiable data (e.g. username, telephone number), the second ephemeral identifier, or the like.

The first service provider 110 determines whether the second user has sufficient assets to cover the amount (e.g. enough money in an account, whether the second user account is associated with a pointer to a block chain asset, etc.).

Several embodiments are contemplated for the transaction server 110 to process the request.

First Embodiments

The first service provider 110 forms a token when the second user has sufficient assets, wherein the token may include data associated with the first user 108 e.g. the first ephemeral identifier or the unique information, and the second user e.g. the second ephemeral ID, the amount, the account associated with the second user. The token may be encrypted with a private key associated with the first service provider, digitally signed, or the like.

The first service provider 110 provides 124 token to second smart phone 102 (e.g. via wideband);

Second software application 124 running on second smart phone 102 provides or offers 136 the token to first user's 108 smart phone (e.g. wirelessly);

First user 108 uses first software application 138 to decide whether to accept payment, i.e. accept the token or not;

When the First user 108 accepts the token, the first software application 138 running on the first smart phone determines whether the token is valid (checks to see if the token has been digitally signed by the first service provider, by using a public key associated with the first service provider);

If valid, first software application 138 may provide 138 a portion of the token back to the first service provider (e.g. via wideband, WIFI, 4G, 5G, etc.);

First service provider 110 receives a portion of the token and determines if the portion is valid;

If valid, first service provider 110 determines the accounts associated with the first user 122 and the second user 106, and the amount (may be encrypted in the portion of the token);

The first service provider transfers the amount from the account associated with the second user 106 to the account associated with the first user 122. Alternatively, the first service provider 110 moves a digital asset pointer (e.g. blockchain address) from the second user's account 106 to the first user's account 122;

In some embodiments, the First service provider 110 sends an confirmation message back to the first smart device and the second smart device (e.g. via wideband);

The messages confirming the transfer may be displayed via the first software application 138 on the first smart device and the second software application 124 on the second smart device.

In other embodiments, processing payments may be performed with the following steps:

The first service provider 110 determines the account 122 associated with the first user 108 from the first ephemeral ID (provided in 132);

The first service provider 110 transfers the amount (or the asset) from the account associated with the second user 106 to the account associated with the first user 122;

The First service provider sends a confirmation message back to the first smart device and the second smart device (e.g. via wideband);

The messages confirming the transfer are displayed via the first software application on the first smart device and the second software application on the second smart device.

As can be seen in the above embodiments, the first user 108 and second user 102 can have an asset transferred (e.g. money, digital asset, bitcoin, etc.) without the first user 108 or the second user 102 sending or receiving any permanent identifier to the other user on their smart devices. In some cases, the cloud-based server 110 may maintain a record of the transaction. In some cases, the transaction may be recorded only in hash form. Such embodiments may be useful in proving a transaction has been completed, without having the details of the transaction being readily apparent. As can be seen in some embodiments, at most, the first user 108 may have the second ephemeral ID of the second user 102, and the second user 102 may have the first ephemeral ID of the first user 108. As these ephemeral IDs are not permanent, i.e. change every 5 minutes, 1 hour, 3 hours, every day, the parties cannot be readily tracked or followed by third parties based upon ephemeral IDs. Accordingly, the privacy of the parties are maintained via the use of temporary or ephemeral IDs to temporarily identify the parties/smart devices during the transaction. In some embodiments, the transaction server may or may not maintain the mapping between ephemeral IDs versus time to a specific user.

Figure 2:
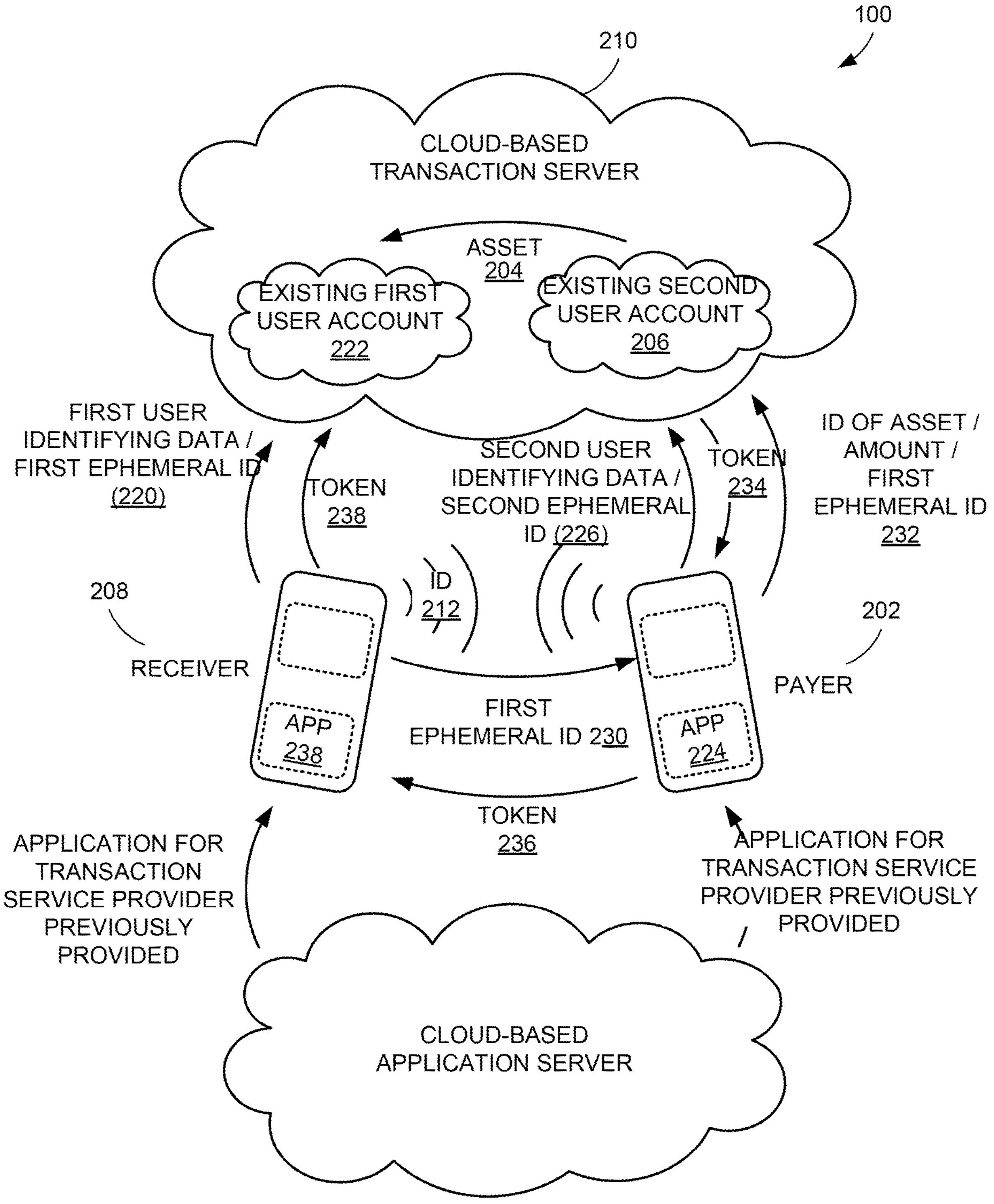
FIG. 2 illustrates another system diagram according to various embodiments.

In the following embodiments illustrated in FIG. 2, a second user 202 (payer/sender) desires to transfer an asset 204 (e.g. data, money, blockchain address, etc.) to a first user 208 (payee/receiver). The users are registered with a service provider.

In the following embodiments, payments (or asset transfer) from a payment sender user 202 registered) to a payment receiver user 208 (registered) (See FIG. 2) are disclosed:

Payment Receiver Interactions:

A payment receiver 208 (e.g. POS terminal, iPad, smart phone) already has an account 222 established with a first service provider 210, and has a first software application 238 associated with transaction server 210 loaded thereon;

The payment receiver 208 (via their smart device) provides 212 a pre-formed identifier (NFC tag, QR code, optical code, rf tag) associated with the first service provider 210;

The payment receiver 208 provides a permanent identifier (e.g. username, telephone number, email address) and a non-permanent identifier (e.g. a first ephemeral ID, Bluetooth MAC address) 220 to the first service provider 210 (i.e. via wideband, e.g. WIFI, 4G, 5G, mesh network).

Payer Interactions:

The payer 202 provides 226 a permanent identifier (e.g. username, telephone number, email address) and a non-permanent identifier (e.g. a second ephemeral ID, Bluetooth MAC address) to the first service provider 210 (i.e. via wideband, e.g. WIFI, 4G, 5G, mesh network).

Payer/Receiver Interactions:

The payment sender 202 has an account 206 pre-established with the first service (transaction) provider 210 (e.g. associated with identifying information of the payment sender, e.g. the telephone number, e-mail address);

The payment sender 202 uses the first smart phone to capture (NFC communication, image capture, rf transmission) the pre-formed identifier 212 (optional step);

The software program 224 associated with the first service provider 210 (pre-loaded, pre-cached, etc.) is selected. Alternatively, the payment sender 202 may select the software program via a smart device screen;

The payer smart device may use biometric authentication (via smart phone operating system) of the payment sender (e.g. fingerprint, face image, etc.) to authorize the payment sender to access the software program 224;

The smart phone of the payment sender 202 activates the software application 224 when biometric authentication confirmed;

A communication channel is initiated between the first smart device and the first service provider 210 (via wideband);

The first smart phone provides 220 permanently identifying information to the first service provider (e.g. a telephone number, an email address, etc.) and non-permanent identifying information (e.g. a first ephemeral identifier, etc.).

In some embodiments Payer and Payment receiver interactions may be performed, as follows:

The payment receiver advertises itself 212 (i.e. wirelessly, e.g. via Bluetooth, BLE, UWB, Zigbee, NFC or other short range wireless communication);

The payment sender/first smart phone receives the advertisement and establishes communication with the payment receiver (e.g. wirelessly);

The payment receiver 208 specifies an amount (or asset) via a software application associated with the first service provider 210; The payment receiver 208 sends 230 the amount (or asset identifier) and other data, (e.g. first ephemeral identifier, a nonce, etc.) to the payment sender;

The smart phone of payment sender 202 under direction of the first software application 224 uploads 232 the amount, the first ephemeral identifier, the unique data, etc. to the first service provider (e.g. via wideband);

The first service (transaction) provider 210 identifies the payment sender account 206 associated with the second ephemeral identifier, etc.;

The first service provider 210 identifies a preestablished account 222 for the payment receiver 208 associated with the first ephemeral identifier;

The first service provider 210 determines whether the payment sender account 206 has sufficient assets for the amount.

Various Embodiments for Processing Payments are Contemplated-First Embodiments

The first service provider 210 forms a token when the payment sender account 206 has sufficient assets, wherein the token includes data associated with the payment sender e.g. the second ephemeral identifier or the unique information, and the payment receiver e.g. the first ephemeral ID, the amount, the second account associated with the second user, or subsets of such data.

The first service provider 210 provides 234 the token to the payment sender (e.g. via wideband);

Software application 224 running on smart phone provides 236 the token to payment receiver (e.g. wirelessly);

The software application 238 running on the payment receiver's 208 smart device determines whether the token is valid (e.g. via cryptographic keys, discussed above);

If valid, software application 238 on the payment receiver provides 238 a portion of the token back to the first service provider (e.g. via wideband, WIFI, 4G, 5G, etc.);

First service provider 210 receives portion of the token and determines if the portion is valid;

If valid, first service provider 210 determines (if not already done) the accounts associated with the payment sender and the payment receiver, and the amount (may be encrypted in the portion of the token);

The first service provider 210 then transfers the amount (or asset) from the account from the payment sender account 206 to the account associated with the payment receiver 222;

The first service provider 210 then sends a confirmation message back to the payment sender 202 and the payment receiver 208 (e.g. via wideband); and Messages confirming the transfer are displayed via the software application on the payment sender mart device and the software application on the payment receiving device.

Other embodiments for processing payments are disclosed below:

The first service provider 210 determines the account associated with the payment receiver 222 from the first ephemeral ID and the account associated with the payment sender 206 from the second ephemeral ID;

If there are sufficient funds (or the asset is present), the first service provider 210 transfers 204 the amount from the account associated with the payment sender 206 to the account associated with the payment receiver 222;

The first service provider 210 sends a confirmation message back to the payment sender smart device and the payment receiver (e.g. via wideband);

Additionally, messages confirming the transfer are displayed via the software application on the payment sender first smart device and the software application on the payment receiver.

As can be seen in some embodiments, at most, the sender 202 may have the first ephemeral ID of the receiver, and the receiver may have the second ephemeral ID of the sender. As these ephemeral IDs are not permanent, i.e. change every 5 minutes, 1 hour, 3 hours, every day, the parties cannot be readily tracked or followed by third parties based upon ephemeral IDs. Accordingly, the privacy of the sender 202 and receiver 208 are maintained via the use of temporary or ephemeral IDs to temporarily identify the parties/smart devices during the transaction. In some embodiments, the transaction server 210 may or may not maintain the mapping between ephemeral IDs versus time to a specific user.

Figure 3:
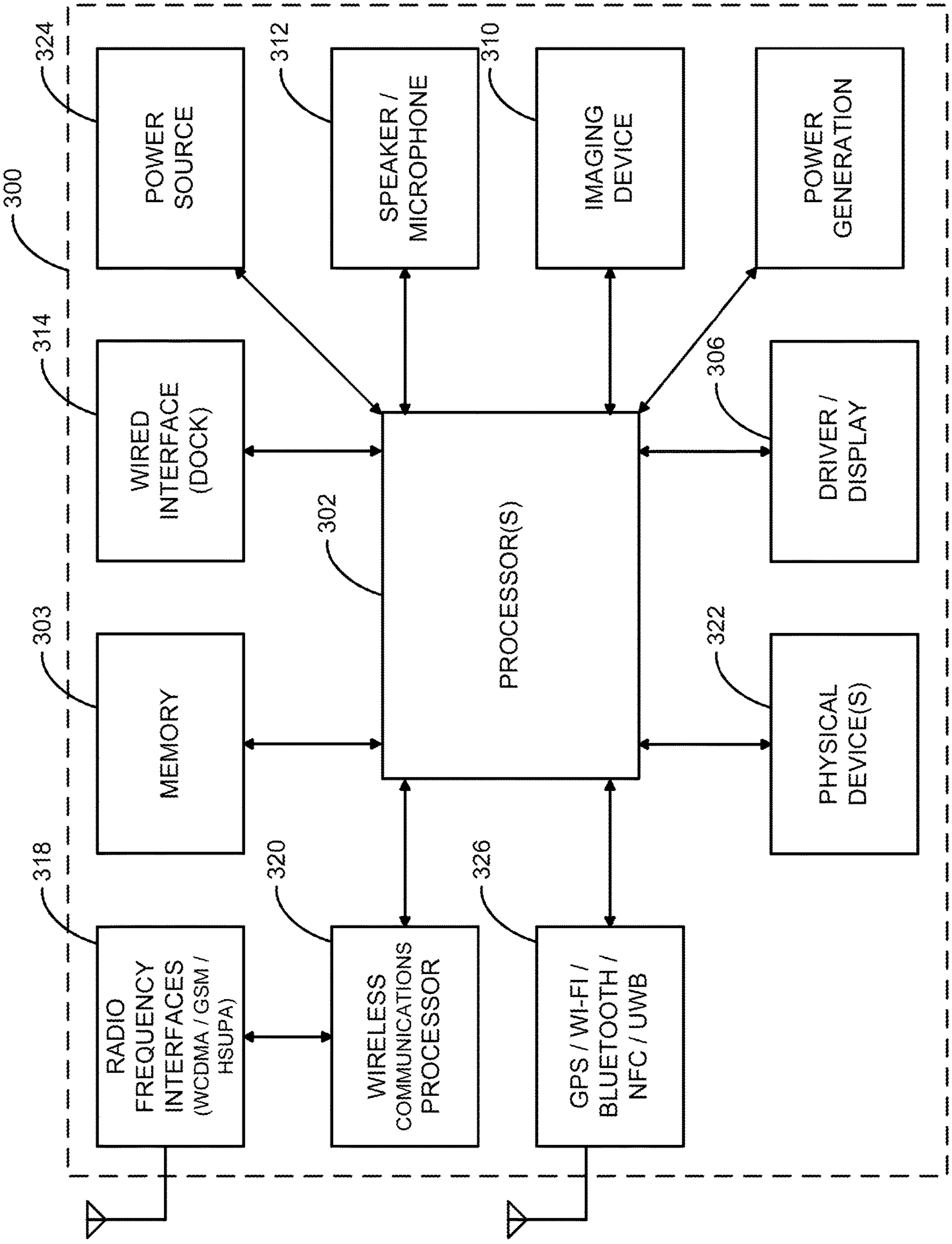
FIG. 3 illustrates a block diagram according to various embodiments.

FIG. 3 illustrates a functional block diagram of various embodiments of the present invention. More specifically, it is contemplated that from user smart devices to cloud-based servers may be implemented with a subset or superset of the below illustrated components. In FIG. 3, a computing device 300 typically includes an applications processor 302, memory 304, a display 306, an image acquisition device 310, audio input/output devices 312, and the like. Additional communications from and to computing device 300 can be provided by via a wired interface 314 (e.g. dock, plug); a GPS/Wi-Fi/Bluetooth interface/UWB 316; RF interfaces 318 and driver 320, and the like. Also included in some embodiments are physical sensors 322 (e.g. (MEMS-based) accelerometers, gyros, magnetometers, pressure sensors, temperature sensors, bioimaging sensors etc.).

In various embodiments, computing device 300 may be a hand-held computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony Playstation VR, Magic Leap, Microsoft HoloLens); a wearable device (e.g. Motiv smart ring, smart headphones); an implanted device (e.g. smart device medical) or the like. Typically, computing device 300 may include one or more processors 302. Such processors 302 may also be termed application processors, and may include a processor core, a video/graphics core, and other cores. Processors 302 may include processor from Apple (A12, A13), NVidia (Tegra), Intel (Core), Qualcomm (Snapdragon), Samsung (Exynos), ARM (Cortex), MIPS technology. In some embodiments, processing accelerators may also be included, e.g. an AI accelerator, Google (Tensor processing unit), a GPU, or the like. It is contemplated that other existing and/or later-developed processors may be used in various embodiments of the present invention.

In various embodiments, memory 304 may include different types of memory (including memory controllers), such as flash memory (e.g. NOR, NAND), SRAM, DDR SDRAM, or the like. Memory 304 may be fixed within computing device 300 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. It is contemplated that other existing and/or later-developed memory and memory technology may be used in various embodiments of the present invention.

In various embodiments, display 306 may be based upon a variety of later-developed or current display technology, including LED or OLED status lights; touch screen technology (e.g. resistive displays, capacitive displays, optical sensor displays, electromagnetic resonance, or the like); and the like. Additionally, display 306 may include single touch or multiple-touch sensing capability. Any later-developed or conventional output display technology may be used for the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 306 may integrated into computing device 300 or may be separate.

In some embodiments of the present invention, acquisition device 310 may include one or more sensors, drivers, lenses and the like. The sensors may be visible light, infrared, and/or UV sensitive sensors that are based upon any later-developed or convention sensor technology, such as CMOS, CCD, or the like. In some embodiments of the present invention, image recognition algorithms, image processing algorithms or other software programs for operation upon processor 302, to process the image data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In various embodiments of the present invention, imaging device 310 may provide user input data in the form of a selfie, biometric data, or the like.

In various embodiments, audio input/output 312 may include conventional microphone(s)/speakers. In various embodiments, voice processing and/or recognition software may be provided to applications processor 302 to enable the user to operate computing device 300 by stating voice commands. In various embodiments of the present invention, audio input 312 may provide user input data in the form of a spoken word or phrase, or the like, as described above. In some embodiments, audio input/output 312 may be integrated into computing device 300 or may be separate.

In various embodiments, wired interface 314 may be used to provide data transfers between computing device 300 and an external source, such as a computer, a remote server, a storage network, another computing device 300, a client device, or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 314 may also provide electrical power, or the like to power source 324, or the like. In other embodiments interface 314 may utilize close physical contact of device 300 to a dock for transfer of data, magnetic power, heat energy, light energy, laser energy or the like. Additionally, software that enables communications over such networks is typically provided.

In various embodiments, a wireless interface 316 may also be provided to provide wireless data transfers between computing device 300 and external sources, such as computers, storage networks, headphones, microphones, cameras, or the like. As illustrated in FIG. 3, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like. As described above, data transmissions between computing device 300 and identity reader 1104 may occur via UWB, Bluetooth, ZigBee, Wi-Fi, a mesh network, or the like.

GPS receiving capability may also be included in various embodiments of the present invention. As illustrated in FIG. 3, GPS functionality is included as part of wireless interface 316 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces 318 and drivers 320 in various embodiments. In various embodiments, RF interfaces 318 may support any future-developed or conventional radio frequency communications protocol, such as CDMA-based protocols (e.g. WCDMA), GSM-based protocols, HSUPA-based protocols, G4, G5, or the like. In the embodiments illustrated, driver 320 is illustrated as being distinct from applications processor 302 and wireless interface 316. However, in some embodiments, various functionality are provided upon a single IC package, for example the Marvel PXA330 processor, and the like. It is contemplated that some embodiments of computing device 300 need not include the wide area RF functionality provided by RF interface 318 and driver 320.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 306 and inputs/or outputs to physical sensors 322 may be processed in parallel processing threads. In other embodiments, such events or outputs may be processed serially, or the like. Inputs and outputs from other functional blocks may also be processed in parallel or serially, in other embodiments of the present invention, such as acquisition device 310 and physical sensors 322.

In some embodiments of the present invention, physical sensors 322 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 300, and a user of device 300. Such data may include physical motion data, pressure data, orientation data, or the like. Data captured by sensors 322 may be processed by software running upon processor 302 to determine characteristics of the user, e.g. gait, gesture performance data, or the like. In some embodiments, sensors 322 may also include physical output data, e.g. vibrations, pressures, and the like.

In some embodiments, a power supply 324 may be implemented with a battery (e.g. LiPo), ultracapacitor, or the like, that provides operating electrical power to device 300. In various embodiments, any number of power generation techniques may be utilized to supplement or even replace power supply 324, such as solar power, liquid metal power generation, thermoelectric engines, rf harvesting (e.g. NFC) or the like.

FIG. 3 is representative of one computing device 300 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, a smart phone configured to perform may of the functions described above includes most if not all of the illustrated functionality. As another example, a biometric acquisition device, e.g. a smart ring (electronic devices enclosed in a ring-shaped shell, enclosure, or form factor), may include some of the functional blocks in FIG. 3, it need not include a high-resolution display 330 or a touch screen, a speaker/microphone 360, wired interfaces 370, or the like. In still other examples, a cloud-based server or a virtual machine (VM) may not include image acquisition device 312, MEMs devices 322, GPS capability 316, and the like, further components described above may be distributed among multiple computers, virtual machines, or the like.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

Further embodiments can be envisioned to one of ordinary skill in the art after reading this disclosure. For example, in some embodiments, smart devices may be smart phones, smart rings, smart glasses, or other smart devices. Additionally, the assets may be tangible assets, e.g. movement of coins, art work, etc., intangible assets, e.g. credits, account amounts, etc., indirect assets, e.g. pointers to asset locations, etc.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A system for secure transfer of an asset with increased party privacy comprises:

a cloud-based transaction server storing a first account associated with a first party and a second account associated with a second party;

a first smart device coupled to the cloud-based transaction server, wherein the first smart device comprises:

a first processor configured to:

authenticate a first user of the first smart device based at least in part on biometric authentication;

activate, based at least in part on authenticating the first user, a first software application associated with the cloud-based transaction server; and generate a first ephemeral identifier that is temporarily associated with the first user, wherein the first ephemeral identifier changes according to a first periodicity;

a first wide-area network transceiver coupled to the first processor, wherein the first wide-area network transceiver is configured to output first identification data associated with the first party and the first ephemeral identifier to the cloud-based transaction server under direction of the first processor, wherein the first ephemeral identifier is ephemerally associated with the first party; and a first short-range transceiver coupled to the first processor, wherein the first short-range transceiver is configured to output first data comprising the first ephemeral identifier under direction of the first processor; and a second smart device coupled to the cloud-based transaction server and to the first smart device, wherein the second smart device comprises:

a second processor configured to:

authenticate a second user of the first smart device based at least in part on biometric authentication;

activate, based at least in part on authenticating the second user, a second software application associated with the cloud-based transaction server; and generate a second ephemeral identifier that is temporarily associated with the second user, wherein the second ephemeral identifier changes according to a second periodicity;

a second short-range transceiver coupled to the second processor, wherein the second short-range transceiver is configured to receive the first data from the first smart device; and a second wide-area network transceiver coupled to the second processor, wherein the second wide-area network transceiver is configured to output second identification data associated with the second party, the second ephemeral identifier, the first data, and a request to the cloud-based transaction server under direction of the second processor, wherein the second ephemeral identifier is ephemerally associated with the second party;

wherein the cloud-based transaction server is further configured to:

form a token in response to the first data and in response to successful transfer of the asset from the second account to the first account;

encrypt the token using a private key associated with the cloud-based transaction server; and output the encrypted token to the second smart device;

wherein the cloud-based transaction server is also configured to identify the second account associated with the second party in response to the second identification data;

wherein the cloud-based transaction server is configured to store a record of the transfer of the asset from the second account to the first account, the record of the transfer comprising a hash value associated with the transfer;

wherein the cloud-based transaction server is also configured to identify the first account associated with the first party in accordance with the first data comprising the first ephemeral identifier based at least in part on receiving the first identification data and first ephemeral identifier from the first smart device;

wherein the cloud-based transaction server is also configured to transfer an asset from the second account to the first account, in response to the request; and wherein the second smart device is configured to store data associated with the first party, wherein the stored data comprises the first ephemeral identifier and does not comprise the first identification data associated with the first user.

2. The system of claim 1, wherein the second wide-area network transceiver of the second smart device is configured to receive the token from the cloud-based transaction server;

wherein the first short-range transceiver of the first smart device is configured to receive the token from the second smart device;

wherein the first processor of the first smart device is configured to validate authenticity of the token; and wherein the first smart device is configured to output a tangible signal to the first party in response to the token being validated by the first processor.

3. The system of claim 2, wherein the first smart device comprises a display; and wherein the tangible signal comprises a success message on the display.

4. The system of claim 2, wherein the first wide-area network transceiver is configured to output the token to the cloud-based transaction server;

wherein the cloud-based transaction server is configured to validate authenticity of the token in response to the first data; and wherein the first wide-area network transceiver is configured to receive confirmation that the authenticity of the token is validated from the cloud-based transaction server.

5. The system of claim 4, wherein the second short-range transceiver is configured to output second data comprising the second ephemeral identifier under direction of the second processor;

wherein the first wide-area network transceiver is configured to output the second data to the cloud-based transaction server; and wherein the cloud-based transaction server is configured to validate authenticity of the token also in response to the second data.

6. The system of claim 1, wherein the first wide-area network transceiver is also configured to receive a first application software associated with the cloud-based transaction server from a cloud-based application server, wherein the first application software is characterized by a first size;

wherein the second wide-area network transceiver is also configured to receive a second application software associated with the cloud-based transaction server from the cloud-based application server, wherein the second application software is characterized by a second size; and wherein the second size is at least double the first size.

7. The system of claim 6, wherein the second smart device comprises an application identifier; and wherein the first smart device comprises a reader device configured to determine the application identifier from the second smart device.

8. The system of claim 7, wherein the reader device is selected from a group comprising: a camera and a near field communication (NFC) device.

9. The system of claim 7, wherein the application identifier is selected from a group comprising: a near field communication (NFC) tag, a quick response (QR) code, a barcode, and a symbol.

10. The system of claim 7, wherein the application identifier is associated with the first application software.

11. A method for a system to provide secure transfer of an asset with increased party privacy, the method comprising:

authenticating, via a first processor of a first smart device, a first user of the first smart device based at least in part on biometric authentication;

activating, based at least in part on authenticating the first user, a first software application associated with a cloud-based transaction server;

generating a first ephemeral identifier that is temporarily associated with the first user, wherein the first ephemeral identifier changes according to a first periodicity;

outputting, with a first wide-area network transceiver of the first smart device, first identification data associated with a first party and the first ephemeral identifier to the cloud-based transaction server, wherein the first ephemeral identifier is ephemerally associated with the first party;

determining, with the cloud-based transaction server, a first account associated with the first party in response to the first identification data;

associating, with the cloud-based transaction server, the first account associated with the first ephemeral identifier;

outputting, with a first short-range transceiver of the first smart device, a first data set comprising the first ephemeral identifier to a second smart device, wherein the second smart device is configured to store data associated with the first party, the stored data comprising only the first ephemeral identifier;

receiving, with a second short-range transceiver of a second smart device, the first data set from the first smart device;

authenticating, via a second processor of the second smart device, a second user of the second smart device based at least in part on biometric authentication;

activating, based at least in part on authenticating the second user, a second software application associated with the cloud-based transaction server;

generating a second ephemeral identifier that is temporarily associated with the second user, wherein the second ephemeral identifier changes according to a second periodicity;

outputting, with a second wide-area network transceiver of the second smart device, second identification data associated with a second party, the second ephemeral identifier, and at least a portion of the first data set to the cloud-based transaction server, wherein the second ephemeral identifier is ephemerally associated with the second party;

determining, with the cloud-based transaction server, a second account associated with the second party in response to the second identification data;

identifying, with the cloud-based transaction server, the first account associated with the first party in accordance with the at least the portion of the first data set comprising the first ephemeral identifier based at least in part on receiving the first identification data and the first ephemeral identifier from the first smart device;

transferring, with the cloud-based transaction server, an asset from the second account to the first account based at least in part on identifying the first account;

storing, with the cloud-based transaction server, a record of the transfer of the asset from the second account to the first account, the record of the transfer comprising a hash value associated with the transfer;

forming, with the cloud-based transaction server, a token in response to the first data set and in response to successful transfer of the asset from the second account to the first account;

encrypting, with the cloud-based transaction server, the token using a private key associated with the cloud-based transaction server; and outputting, with the cloud-based transaction server, the encrypted token to the second smart device.

12. The method of claim 11, further comprising:

determining, with the cloud-based transaction server, the token in response to at least the portion of the first data set and in response to the asset being transferred from the second account to the first account;

providing, with the cloud-based transaction server, the token to the second smart device;

receiving, with the second wide-area network transceiver, the token from the cloud-based transaction server;

providing, with the second short-range transceiver, the token to the first smart device;

receiving, with the first short-range transceiver of the first smart device, the token from the second smart device;

determining, with a processor of the first smart device, whether the token is authentic; and providing, with an output device of the first smart device, a tangible output in response to the token being determined to be authentic.

13. The method of claim 12, wherein the output device comprises a display; and wherein the tangible output comprises a message on the display.

14. The method of claim 12, further comprising:

outputting, with the first wide-area network transceiver, the token to the cloud-based transaction server;

determining, with the cloud-based transaction server, whether the token is authentic; and receiving, with the first wide-area network transceiver, confirmation that the token is authentic from the cloud-based transaction server.

15. The method of claim 14, further comprising:

outputting, with the second short-range transceiver, a second data set comprising the second ephemeral identifier to the first smart device; and outputting, with first wide-area network transceiver, the second data set to the cloud-based transaction server;

wherein determining with the cloud-based transaction server is authentic is token also in response to the second data set.

16. The method of claim 11, further comprising:

receiving, with the first wide-area network transceiver, a first application software associated with the cloud-based transaction server from a cloud-based application server, wherein the first application software is characterized by a first size; and receiving, with the second wide-area network transceiver, a second application software associated with the cloud-based transaction server from the cloud-based application server, wherein the second application software is characterized by a second size;

wherein the second size is at least double the first size.

17. The method of claim 16, wherein the second smart device comprises an application identifier; and wherein the method further comprises determining, with a reader device in the first smart device, the application identifier from the second smart device.

18. The method of claim 17, wherein the reader device is selected from a group comprising: a camera and a near field communication (NFC) device.

19. The method of claim 17, wherein the application identifier is selected from a group comprising: a near field communication (NFC) tag, a quick response (QR) code, a barcode, and a symbol.

20. The method of claim 17, wherein the application identifier is associated with the first application software.

* * * * *